(12) United States Patent
Narita

(10) Patent No.: US 8,490,386 B2
(45) Date of Patent: Jul. 23, 2013

(54) METHOD FOR DETECTING ABNORMALITY IN REDUCING AGENT

(75) Inventor: Hironori Narita, Tokyo (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 13/254,926

(22) PCT Filed: Feb. 24, 2010

(86) PCT No.: PCT/JP2010/001231
§ 371 (c)(1),
(2), (4) Date: Sep. 6, 2011

(87) PCT Pub. No.: WO2010/125725
PCT Pub. Date: Nov. 4, 2010

(65) Prior Publication Data
US 2012/0000270 A1    Jan. 5, 2012

(30) Foreign Application Priority Data
Apr. 30, 2009   (JP) ................................ 2009-110843

(51) Int. Cl.
*F01N 3/00*   (2006.01)

(52) U.S. Cl.
USPC ................... 60/277; 60/286; 60/295; 60/301

(58) Field of Classification Search
USPC .................................... 60/286, 277, 301, 295
See application file for complete search history.

(56) References Cited

U.S. PATENT DOCUMENTS

| | | | |
|---|---|---|---|
| 2008/0178656 A1* | 7/2008 | Nieuwstadt et al. | 73/23.31 |
| 2010/0037599 A1 | 2/2010 | Toshioka et al. | |
| 2012/0000185 A1* | 1/2012 | Narita | 60/274 |

FOREIGN PATENT DOCUMENTS

| | | |
|---|---|---|
| JP | 2003 314258 | 11/2003 |
| JP | 2007 218146 | 8/2007 |
| JP | 2008 291828 | 12/2008 |
| JP | 2009 79584 | 4/2009 |

OTHER PUBLICATIONS

U.S. Appl. No. 13/255,177, filed Sep. 7, 2011, Narita.
International Search Report Issued May 25, 2010 in PCT/JP10/001231 filed Feb. 24, 2010.

* cited by examiner

*Primary Examiner* — Lisa Caputo
*Assistant Examiner* — Punam Roy
(74) *Attorney, Agent, or Firm* — Oblon, Spivak, McClelland, Maier & Neustadt, L.L.P.

(57) ABSTRACT

Disclosed is a method for detecting abnormality in a reducing agent replenished into a reducing agent tank in an exhaust emission control device for reduction and removal of $NO_x$ through addition of the reducing agent from the tank to a selective reduction catalyst incorporated in an exhaust pipe. Replenishment of the reducing agent to the tank is detected to wait elapse of a removal-rate stabilization period, i.e., a period from the detected replenishment to stabilization of the $NO_x$ removal rate. It is determined that a dilute reducing agent or/and a different material are replenished into the tank if an abnormal lowering of a measured $NO_x$ removal rate is detected during a determination period after the removal-rate stabilization period.

3 Claims, 3 Drawing Sheets

METHOD FOR DETECTING ABNORMALITY IN REDUCING AGENT

TECHNICAL FIELD

The present invention relates to a method for detecting abnormality in a reducing agent used for an exhaust emission control device.

BACKGROUND ART

Conventionally, some diesel engines have a selective reduction catalyst incorporated in an exhaust pipe through which exhaust gas flow, said catalyst having a property of selectively reacting $NO_x$ with a reducing agent even in the presence of oxygen. From a reducing agent tank, a required amount of reducing agent is added upstream of the selective reduction catalyst and is reacted on the catalyst with $NO_x$ (nitrogen oxides) in the exhaust gas to thereby decrease a concentration of $NO_x$ discharged.

Effectiveness of ammonia ($NH_3$) used as a reducing agent for reduction and removal of $NO_x$ is well known in a field of industrial flue gas denitration in a plant or the like. However, in a field of an automobile where safety is hard to assure as to running with ammonia itself being loaded, recently used as the reducing agent is nontoxic urea water.

For example, Patent Literature 1 is already present as prior document related to the invention.

CITATION LIST

Patent Literature
[Patent Literature 1] JP 2007-218146A

SUMMARY OF INVENTION

Technical Problems

Such exhaust emission control device has, however, a problem that mistaken replenishment of a dilute reducing agent or a different material such as water into the reducing agent tank, which will lower a $NO_x$ removal rate, cannot be easily notified of to a driver or the like.

More specifically, preceding addition of the reducing agent to the selective reduction catalyst causes the reducing agent to be adsorbed by the catalyst, and the adsorbed reducing agent is thereafter allowed to discharge, which may make the $NO_x$ removal rate normal for a certain period. Thus, there exits a problem that whether a dilute reducing agent or/and the like are mistakenly replenished or not cannot be properly determined on the basis of the lowering of the $NO_x$ removal rate.

Moreover, the $NO_x$ removal rate may be also lowered by deterioration of the selective reduction catalyst. Thus, there exits a problem that undistinguishable are a case where a dilute reducing agent or/and the like are mistakenly replenished from a case where the selective reduction catalyst is deteriorated.

The invention was conceived in view of the above and has its object to provide a method for detecting abnormality in a reducing agent which detects mistaken replenishment of a dilute reducing agent or/and a different material into a reducing agent tank.

Solution to Problems

The invention provides a method for detecting abnormality in a reducing agent replenished into a reducing agent tank in an exhaust emission control device for reduction and removal of $NO_x$ through addition of the reducing agent from said tank to a selective reduction catalyst incorporated in an exhaust pipe, which comprises the steps of detecting replenishment of the reducing agent to said tank, waiting elapse of a removal-rate stabilization period, i.e., a period from the detected replenishment to stabilization of the $NO_x$ removal rate, and determining that a dilute reducing agent or/and a different material are replenished into the tank if an abnormal lowering of a measured $NO_x$ removal rate is detected during a determination period after the removal-rate stabilization period.

In the invention, it is preferable that the abnormal lowering of the measured $NO_x$ removal rate is detected by comparison of an actually measured $NO_x$ removal rate with a reference $NO_x$ removal rate.

In the invention, it is preferable that when the abnormal lowering of the measured $NO_x$ removal rate cannot be detected, the actually measured $NO_x$ removal rate is recorded as a normal $NO_x$ removal rate to the reference $NO_x$ removal rate.

In the invention, it is preferable that the dilute reducing agent has a concentration lowering the concentration of the reducing agent in the tank, the different material being a different solution or/and a different solute lowering the concentration of the reducing agent in the tank.

Advantageous Effects of Invention

According to a method for detecting abnormality in a reducing agent of the invention, when a dilute reducing agent or/and a different material are mistakenly replenished into a reducing agent tank, an abnormal lowering of a measured $NO_x$ removal rate occurs; as a result, it is determined that the dilute reducing agent or/and the different material are mistakenly replenished, which determination is notified of to a driver or the like. Moreover, the reducing agent adsorbed by the selective reduction catalyst is allowed to discharge during a removal-rate stabilization period, and change of the $NO_x$ removal rate based on an effect of the selective reduction catalyst is detected during a determination period without adversely affected by the reducing agent adsorbed by the selective reduction catalyst, so that mistaken replenishment of the dilute reducing agent or/and the like can be properly determined. Furthermore, the deteriorated selective reduction catalyst always brings about abnormal lowering of the $NO_x$ removal rate regardless of, for example, replenishment of the reducing agent whereas, when the dilute reducing agent or/and the like are mistakenly replenished, the abnormal lowering of the $NO_x$ removal rate occurs during the determination period, so that the mistaken replenishment of the dilute reducing agent or/and the like can be properly determined. As above, various excellent effects can be obtained.

DESCRIPTION OF EMBODIMENT

An embodiment of the invention will be described with reference to the drawings.

Figure 1:
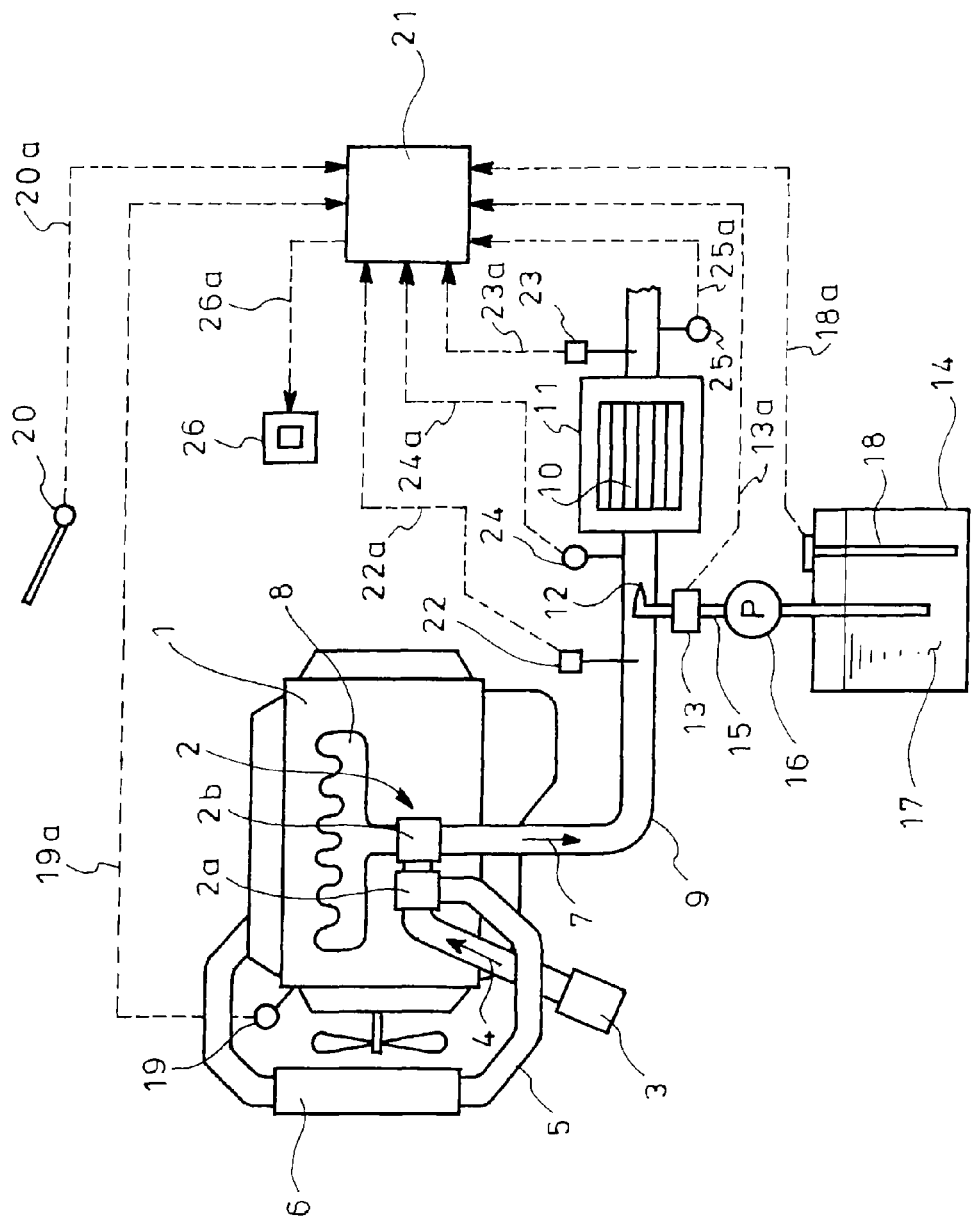
FIG. 1 is a schematic diagram showing an embodiment of the invention.
Figure 2:
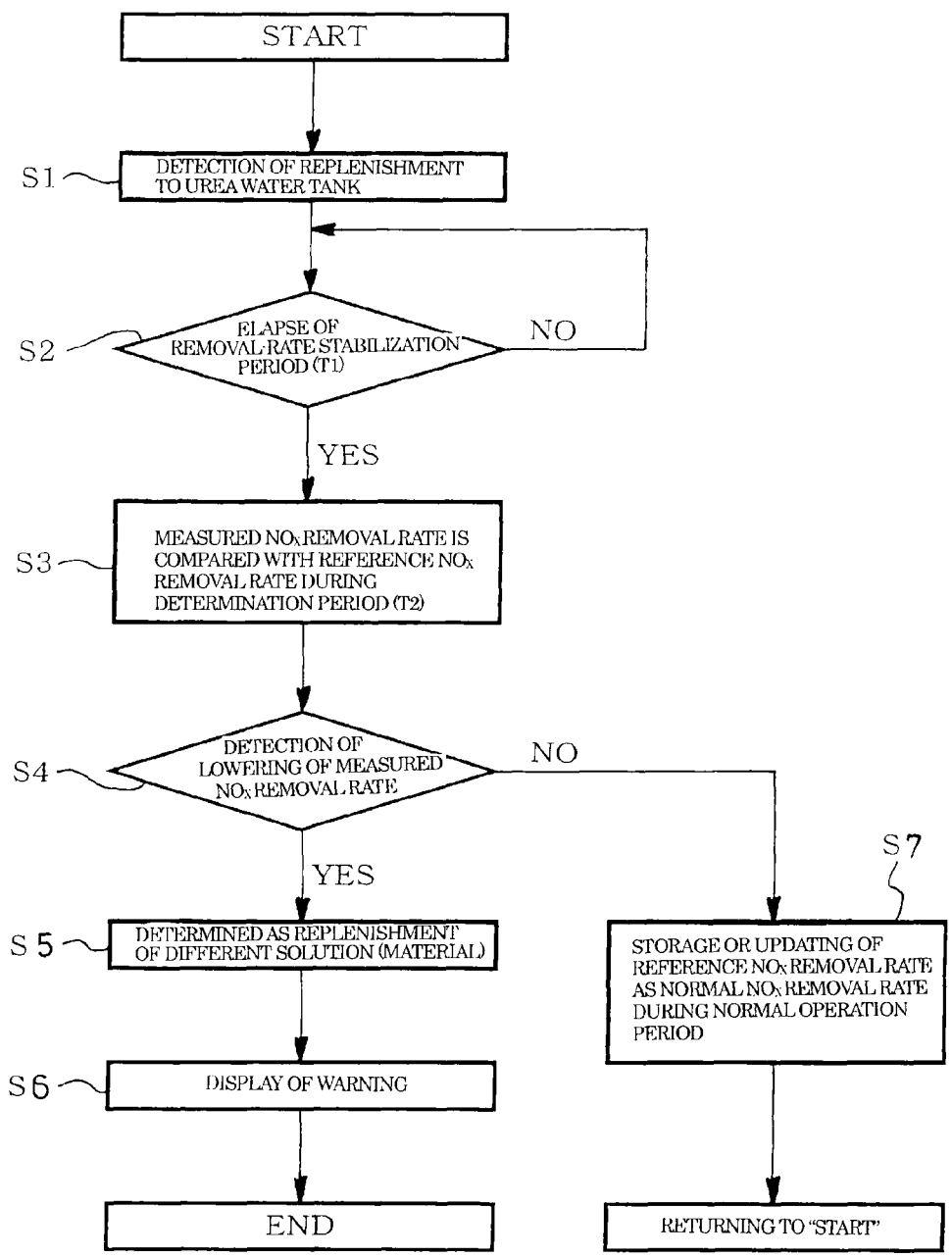
FIG. 2 is a flowchart of processes in the embodiment of the invention.
Figure 3:
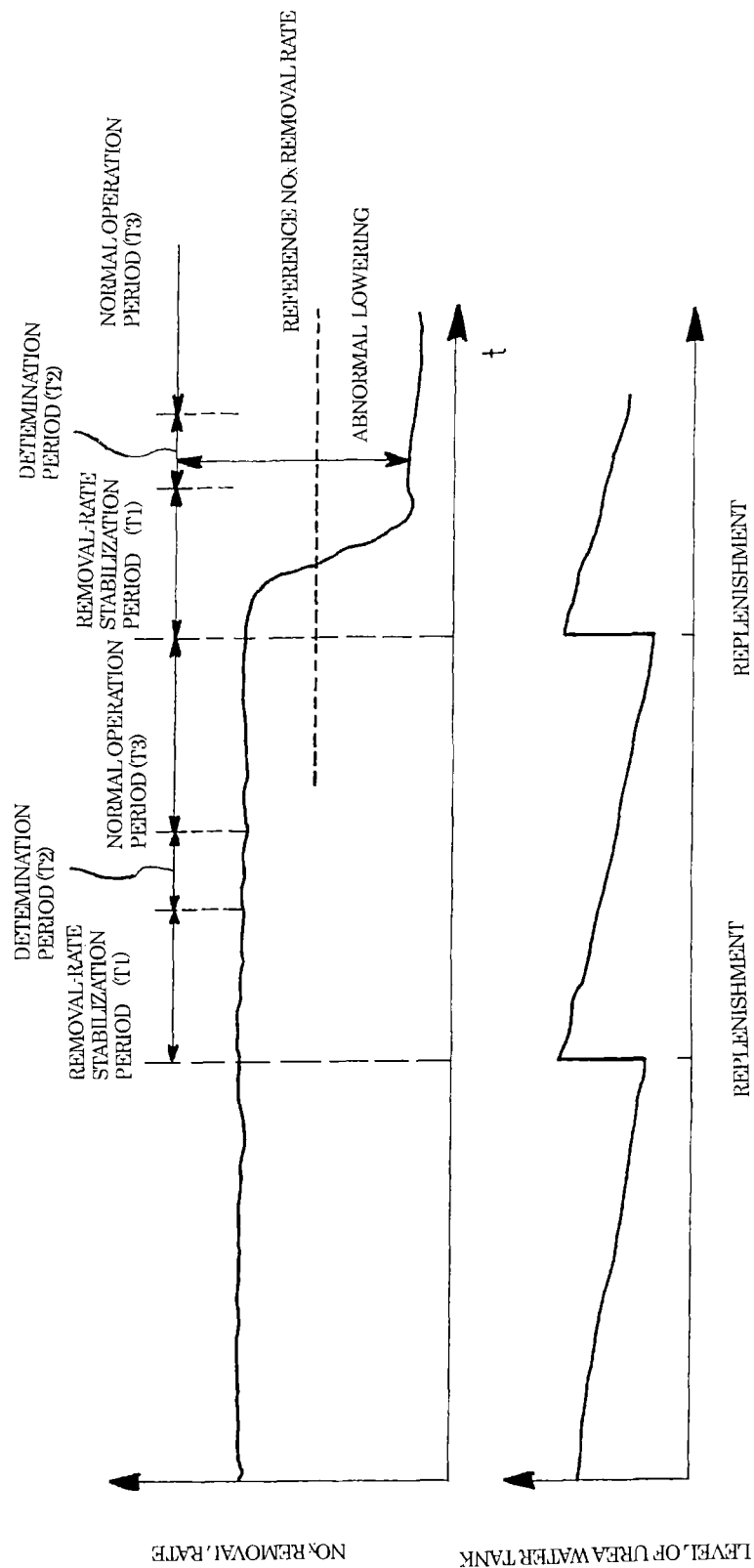
FIG. 3 is a diagram of graphs showing change of $NO_x$ removal rate and a level of a urea water tank.

FIGS. 1-3 are directed to the embodiment of the invention and show an exhaust emission control device and a method for detecting abnormality in a reducing agent. In FIG. 1, a reference numeral 1 denotes an engine which is a diesel engine. The engine 1 shown is provided with a turbocharger 2 having a compressor 2a to which air 4 from an air cleaner 3 is guided through an intake pipe 5. The air 4 compressed by the compressor 2a is further guided to an intercooler 6 where the air 4 is cooled and guided to an intake manifold (not shown) so as to be introduced into each of cylinders of the engine 1.

An exhaust gas 7 discharged from each of the cylinders of the engine 1 is guided through an exhaust manifold 8 to a turbine 2b of the turbocharger 2. After driving the turbine 2b, the exhaust gas 7 is discharged outside of an automobile through an exhaust pipe 9.

A selective reduction catalyst 10 carried by a casing 11 is incorporated in the exhaust pipe 9 through which the exhaust gas 7 flows, is formed as a flow-through type honeycomb structure and has a property capable of selectively reacting $NO_x$ with ammonia ($NH_3$) even in the presence of oxygen.

Further, a urea water injection valve 13 with an injection nozzle 12 is arranged upstream of the casing 11 and is connected through a urea water supply line 15 to a urea water tank (reducing agent tank) 14 provided at any required site, so that urea water (reducing agent) 17 in the tank 14 can be added upstream of the selective reduction catalyst 10 through the injection valve 13 by driving a supply pump 16 incorporated in the supply line 15. The tank 14 is provided with a liquid level detecting means 18 such as a liquid level sensor which detects a liquid level of the urea water 17 inside. The detecting means 18 may employ a float, ultrasound or the like or may be of any other configuration, provided that the liquid level of the urea water 17 inside can be detected. The urea water tank 14 is not limited to the configuration including the injection nozzle 12, the injection valve 13, the supply line 15 and the supply pump 16 and may be of any other configuration, provided that the urea water 17 can be added upstream of the selective reduction catalyst 10.

The engine 1 is provided with a rotation sensor 19 which detects a rotation number of the engine. A rotation number signal 19a from the sensor 19 and a load signal 20a from an accelerator sensor 20 (a sensor detecting a stepping-on angle of an accelerator pedal) are input to a controller 21 as an engine control computer (ECU: Electronic Control Unit).

On the other hand, an amount of $NO_x$ generated is estimated in the controller 21 on the basis of a current driving state determined from the rotation number and load signals 19a and 20a from the sensors 19 and 20, respectively. An amount of urea water 17 to be added is calculated in conformity with the estimated amount of $NO_x$ generated; and addition of the required amount of urea water 17 is executed. More specifically, a valve opening command signal 13a is output to the injection valve 13 and a driving command signal (not shown) is output to the supply pump 16, so that the amount of urea water 17 to be added is properly controlled by an valve opening action of the injection valve 13, and an injection pressure necessary for the addition can be suitably acquired by the driving of the supply pump 16. Further, the controller 21 estimates the amount of urea water 17 in the tank 14 on the basis of a liquid level signal 18a from the liquid level detecting means 18 so as to determine the remaining amount of urea water 17 and a timing to replenish the urea water 17.

$NO_x$ sensors 22 and 23 for detection of $NO_x$ concentrations and temperature sensors 24 and 25 for detection of exhaust temperatures are disposed at an entrance and an exit of the casing 11 carrying the selective reduction catalyst 10, respectively, to input detection signals 22a and 23a and 24a and 25a to the controller 21 so as to detect an actually measured $NO_x$ removal rate on the basis of the detection signals 22a and 23a and 24a and 25a. The actually measured $NO_x$ removal rate may be detected on the basis of any of the detection signals 22a and 23a and 24a and 25a or any other signal or signals may be used; means and a method for detection are not especially limited, provided that the actually measured $NO_x$ removal rate can be detected.

The controller 21 is connected to display means 26 such as a display monitor or lamp which indicates abnormality under a predetermined condition by a display signal 26a. The controller 21 preliminarily has a built-in function to execute processes based on the flow of FIG. 2.

An operation of the embodiment of the invention will be described.

In order to lower the concentration of $NO_x$ discharged in the exhaust gas 7 by the exhaust emission control device, from the urea water tank 14, the urea water 17 is added upstream of the selective reduction catalyst 10 to bring about a reducing reaction of the urea water 17 with $NO_x$ in the exhaust gas on the catalyst 10 to thereby decrease the concentration of $NO_x$ discharged.

Thereafter, replenishment of the urea water 17 to the tank 14 for compensation of the decrease of the urea water 17 in the tank 14 due to the addition of the urea water 17 from the tank 14 is detected by the liquid level detecting means 18 (step S1). Elapse of a period from the detected replenishment to stabilization of the $NO_x$ removal rate, which is referred to as removal-rate stabilization period T1, is waited (step S2). The stabilization period T1 is set as a period up to discharge and complete consumption of ammonia having been adsorbed by the selective reduction catalyst 10 through the preceding addition of the urea water 17, and is properly set in view of, for example, kind, size and reactivity of the catalyst.

Then, the removal-rate stabilization period T1 shifts to a determination period T2 where the actually measured $NO_x$ removal rate based, for example, on the detection signals 22a and 23a and a calculated value depending on an engine state is compared with a reference $NO_x$ removal rate recorded in advance (step S3). An abnormal lowering of the measured $NO_x$ removal rate is detected based on whether the measured $NO_x$ removal rate is lower than the reference $NO_x$ removal rate or not (step S4). When the measured $NO_x$ removal rate is lower than the reference $NO_x$ removal rate, it is determined that the abnormal lowering of the $NO_x$ removal rate is present (YES in step S4); when the $NO_x$ removal rate is not lower than the reference $NO_x$ removal rate, it is determined that no abnormal lowering of the $NO_x$ purification rate is present (NO in step S4). Here, the determination period T2 is set as a period where the selective reduction catalyst 10 has no urea water 17 adsorbed and acts properly. The abnormal lowering of the $NO_x$ removal rate may be determined, using as a threshold value a sum of the reference $NO_x$ removal rate with a variable or using any other data value as a threshold value.

The determination of the abnormal lowering of the $NO_x$ removal rate (YES in step S4) is followed by determining that a dilute urea water 17 or/and a different material are mistakenly replenished into the tank 14 (step S5). Here, the dilute urea water 17 is not limited to that with a specific concentration, provided that it has a concentration which lowers the concentration of the usual urea water 17 in the tank 14; the different material has no specific limitation, provided that it is a different solution such as water, fuel or the like or/and a different solute lowering the concentration of the reducing agent.

After determining that the dilute urea water 17 or/and the different material are mistakenly replenished, the controller 21 transmits the display signal 26a to the display means 26 where a warning of the mistaken replenishment of the dilute urea water 17 or/and the like into the tank 14 is generated and notified of to the driver or the like (step S6).

When the selective reduction catalyst 10 is deteriorated, the actually measured $NO_x$ removal rate is lowered already at a start of the removal-rate stabilization period T1; thus, at this point, it is determined that the selective reduction catalyst 10 is deteriorated and the processes are shut down without shifted to the step of the determination period T2 (step 3) to conduct for example a display of warning to the effect that the selective reduction catalyst 10 is deteriorated. If the deterioration of the selective reduction catalyst 10 is determined by any other process, the determination of presence/absence of the deterioration of the catalyst 10 may be followed by determining whether the dilute urea water and/or the like are mistakenly replenished or not.

On the other hand, when it is determined that the $NO_x$ removal rate has no abnormal lowering (NO in step S4), the determination period T2 shifts to a normal operation period T3 where the actually measured $NO_x$ removal rate is used as a normal $NO_x$ removal rate for record of a reference $NO_x$ removal rate or for updating of the existing reference $NO_x$ removal rate (step S7). Then, returning is made to the first step and the same processes are repeated. Here, the normal operation period T3 is set to be a period from finishing of the determination period T2 up to replenishment of the urea water 17 again.

Thus, according to the embodiment, mistaken replenishment of the dilute urea water 17 or/and the different material into the tank 14 cause the abnormal lowering of the measured $NO_x$ removal rate during the determination period T2, so that it is determined that the dilute urea water 17 or/and the difference material are mistakenly replenished into the tank 14 and the mistaken replenishment is notified of to the driver or the like. Since the reducing agent adsorbed by the selective reduction catalyst 10 is allowed to discharge during the removal-rate stabilization period T1 and only the change of the $NO_x$ removal rate based on the action of the catalyst 10 is detected during the determination period T2 without affected by the urea water 17 adsorbed by the catalyst 10, the mistaken replenishment of the dilute urea water or/and the different material can be properly determined. The deteriorated selection reduction catalyst 10 always causes the abnormal lowering of the $NO_x$ removal rate regardless of, for example, replenishment of the reducing agent whereas mistaken replenishment of the dilute urea water or/and the different material cause the abnormal lowering of $NO_x$ removal rate during the determination period T2. As a result, the case where the dilute urea water 17 or/and the different material are mistakenly replenished can be specifically differentiated from the case where the selective reduction catalyst 10 is deteriorated, so that the mistaken replenishment of the dilute urea water 17 or/and the like can be properly determined.

Moreover, in the embodiment, the abnormal lowering of the measured $NO_x$ removal rate can be easily detected by comparison of the actually measured $NO_x$ removal rate with the reference $NO_x$ removal rate, so that the mistaken replenishment of the dilute urea water 17 or/and the different material can be properly determined.

Moreover, in the embodiment, when the abnormal lowering of the measured $NO_x$ removal rate cannot be detected, record of the actually measured $NO_x$ removal rate as the normal $NO_x$ removal rate to the reference $NO_x$ removal rate during the normal operation period T3 after the determination period T2 can bring about updating of the reference $NO_x$ removal rate, so that mistaken replenishment of the dilute urea water 17 or/and the different material can be properly determined.

It is to be understood that a method for detecting abnormality in a reducing agent according to the invention is not limited to the above embodiment and that various changes and modifications may be made without departing from the scope of the invention. For example, light oil or the like other than the urea water may be used as the reducing agent added to the selective reducing catalyst.

REFERENCE SIGNS LIST 9 exhaust pipe
10 selective reduction catalyst
14 urea water tank (reducing agent tank)
17 urea water (reducing agent)
T1 removal-rate stabilization period
T2 determination period
T3 normal operation period

The invention claimed is:

1. A method for detecting abnormality in a reducing agent replenished into a reducing agent tank in an exhaust emission control device for reduction and removal of $NO_x$ through addition of the reducing agent from said tank to a selective reduction catalyst incorporated in an exhaust pipe, comprising:
   detecting replenishment of the reducing agent to said tank;
   waiting elapse of a removal-rate stabilization period as a period from the detected replenishment to stabilization of the $NO_x$ removal rate; and
   determining that a dilute reducing agent or/and a different material are replenished into the tank if an abnormal lowering of a measured $NO_x$ removal rate is detected during a determination period after the removal-rate stabilization period,
   wherein, when the abnormal lowering of the measured $NO_x$ removal rate cannot be detected, the actually measured $NO_x$ removal rate is recorded as a normal $NO_x$ removal rate to the reference $NO_x$ removal rate during a normal operation period after the determination period.

2. A method for detecting abnormality in a reducing agent replenished into a reducing agent tank in an exhaust emission control device for reduction and removal of $NO_x$ through addition of the reducing agent from said tank to a selective reduction catalyst incorporated in an exhaust pipe, comprising:
   detecting replenishment of the reducing agent to said tank;
   waiting elapse of a removal-rate stabilization period as a period from the detected replenishment to stabilization of the $NO_x$ removal rate; and
   determining that a dilute reducing agent or/and a different material are replenished into the tank if an abnormal lowering of a measured $NO_x$ removal rate is detected during a determination period after the removal-rate stabilization period,
   wherein the abnormal lowering of the measured $NO_x$ removal rate is detected by comparison of an actually measured $NO_x$ removal rate with a reference $NO_x$ removal rate, and
   wherein, when the abnormal lowering of the measured $NO_x$ removal rate cannot be detected, the actually measured $NO_x$ removal rate is recorded as a normal $NO_x$ removal rate to the reference $NO_x$ removal rate during a normal operation period after the determination period.

3. A method for detecting abnormality in a reducing agent replenished into a reducing agent tank in an exhaust emission control device for reduction and removal of $NO_x$ through addition of the reducing agent from said tank to a selective reduction catalyst incorporated in an exhaust pipe, comprising:
  detecting replenishment of the reducing agent to said tank;
  waiting elapse of a removal-rate stabilization period as a period from the detected replenishment to stabilization of the $NO_x$ removal rate; and
  determining that a dilute reducing agent or/and a different material are replenished into the tank if an abnormal lowering of a measured $NO_x$ removal rate is detected during a determination period after the removal-rate stabilization period,
  wherein the dilute reducing agent has a concentration lowering the concentration of the reducing agent in the tank and the different material is a different solution or/and a different solute lowering the concentration of the reducing agent in the tank.

* * * * *